United States Patent
Van Dyck et al.

(10) Patent No.: US 8,371,688 B2
(45) Date of Patent: Feb. 12, 2013

(54) SINGLE PASS RADIATION CURABLE INKJET PRINTING METHODS FOR PRODUCING PRINTED FLEXIBLE FOILS AND PLASTIC BAGS

(75) Inventors: Geert Van Dyck, Ham (BE); Etienne Van Thillo, Essen (BE); Peter Bracke, Drongen (BE)

(73) Assignee: Agfa Graphics NV, Mortsel (BE)

( * ) Notice: Subject to any disclaimer, the term of this patent is extended or adjusted under 35 U.S.C. 154(b) by 446 days.

(21) Appl. No.: 12/739,154

(22) PCT Filed: Oct. 17, 2008

(86) PCT No.: PCT/EP2008/064018
§ 371 (c)(1),
(2), (4) Date: Apr. 22, 2010

(87) PCT Pub. No.: WO2009/053311
PCT Pub. Date: Apr. 30, 2009

(65) Prior Publication Data
US 2010/0309268 A1  Dec. 9, 2010

Related U.S. Application Data (60) Provisional application No. 60/982,808, filed on Oct. 26, 2007, provisional application No. 60/986,099, filed on Nov. 7, 2007.

(30) Foreign Application Priority Data
Oct. 26, 2007 (EP) ..................... 07119374

(51) Int. Cl.
B41J 2/01 (2006.01)
(52) U.S. Cl. ..................... 347/102; 347/101

(58) Field of Classification Search ............... 347/102, 347/101; 101/491; 156/233; 522/71
See application file for complete search history.

(56) References Cited

U.S. PATENT DOCUMENTS

| | | | |
|---|---|---|---|
| 4,529,087 A | 7/1985 | Neal et al. | |
| 2004/0099170 A1* | 5/2004 | Takabayashi | 101/491 |
| 2005/0205200 A1* | 9/2005 | Flosbach et al. | 156/233 |
| 2005/0250869 A1* | 11/2005 | Claes et al. | 522/71 |
| 2007/0182796 A1 | 8/2007 | Ohkubo et al. | |

FOREIGN PATENT DOCUMENTS

| | | | |
|---|---|---|---|
| EP | 1 652 686 A1 | | 5/2006 |
| EP | 1 832 633 A1 | | 9/2007 |
| WO | 99/29788 A1 | | 6/1999 |
| WO | 03/044106 A1 | | 5/2003 |
| WO | WO2007/013368 | * | 2/2007 |
| WO | WO2008/074589 | * | 6/2008 |

OTHER PUBLICATIONS

Official Communication issued in International Patent Application No. PCT/EP2008/064018, mailed on May 6, 2009.

* cited by examiner

*Primary Examiner* — Laura Martin
*Assistant Examiner* — Carlos A Martinez
(74) *Attorney, Agent, or Firm* — Keating & Bennett, LLP (57) ABSTRACT

A radiation curable inkjet printing method for producing printed flexible foils and plastic bags wherein a web-like polymeric substrate having a maximum value for Tan δ between 40° C. and 110° C. and a surface energy $S_{sub}$ is printed upon using a single pass inkjet printer with a non-aqueous radiation curable inkjet liquid having a surface tension $S_{Liq}$, wherein $S_{Liq}$ is smaller than $S_{sub}$ by at least 4 mN/m, and curing the radiation curable liquid on the substrate at a surface temperature equal or higher than the temperature of the maximum value for Tan δ and smaller than the melting point of the polymeric recording medium. A single pass inkjet printer is also disclosed.

9 Claims, 3 Drawing Sheets

SINGLE PASS RADIATION CURABLE INKJET PRINTING METHODS FOR PRODUCING PRINTED FLEXIBLE FOILS AND PLASTIC BAGS

CROSS-REFERENCE TO RELATED APPLICATIONS

This application is a 371 National Stage Application of PCT/EP2008/064018, filed Oct. 17, 2008. This application claims the benefit of U.S. Provisional Application Nos. 60/982,808, filed Oct. 26, 2007, and 60/986,099, filed Nov. 7, 2007, which are incorporated by reference herein in their entirety. In addition, this application claims the benefit of European Application No. 07119374.2, filed Oct. 26, 2007, which is also incorporated by reference herein in its entirety.

FIELD OF THE INVENTION

The present invention relates to radiation curable inkjet printing of materials suitable for making plastic bags.

DESCRIPTION OF THE RELATED ART

In flexography, an image is printed using a mirrored master of the required image as a 3D relief in a rubber or polymer material. A measured amount of ink is deposited upon the surface of the printing plate or printing cylinder. This print surface then contacts the substrate whereby the ink is transferred. Generally cylinders using flexographic printing sleeves are used for reasons of productivity.

Plastic bags have been printed by flexography for many years. For example, U.S. Pat. No. 4,529,087 (MAINE POLY INC.) discloses the production of antistatic plastic bags including a printing step of a polyethylene substrate with a flexographic printing press.

Today, there is an increasing demand for better graphics and brighter, smoother finishes, because printed bags are becoming more important as a marketing tool. This has led to more personalized printed bags, which in turn requires shorter print runs since a smaller number of bags are desired by the customer. Furthermore, also the desired shape and size of a plastic bag now varies over a wide range, leading to frequent changing of cylinders and flexographic printing sleeves with a different diameter. All these evolutions lead to flexography becoming a less economical printing process for plastic bags.

In inkjet printing, tiny drops of ink fluid are projected directly onto an ink-receiver surface without physical contact between the printing device and the ink-receiver. The printing device stores the printing data electronically and controls a mechanism for ejecting the drops image-wise. Printing is accomplished by moving a printhead across the ink-receiver or vice versa or both.

When jetting the inkjet ink onto an ink-receiver, the ink typically includes a liquid vehicle and one or more solids, such as dyes, pigments and polymers. Ink compositions can be roughly divided in:
- water-based, the drying mechanism involving absorption, penetration and evaporation;
- solvent-based, the drying primarily involving evaporation;
- oil-based, the drying involving absorption and penetration;
- hot melt or phase change, in which the ink is liquid at the ejection temperature but solid at room temperature and wherein drying is replaced by solidification; and
- UV-curable, in which drying is replaced by polymerization.

It should be clear that the first three types of ink compositions are more suitable for an absorbing ink-receiver, whereas hot melt inks and UV-curable inks can also be printed on non-absorbing ink-receivers. Due to thermal requirements posed by hot melt inks on the substrates, especially radiation curable inks have gained the interest of the industry in inkjet printing applications.

WO 03/044106 (DOTRIX) discloses single pass inkjet printing methods wherein radiation curable inks are cured on a substrate wherein the region close to the substrate surface is depleted of oxygen.

EP 1652686 A1 (AGFA) discloses a printing process for ink-jet printing a radiation curable image on a substrate including the steps of:
a) providing a radiation curable liquid layer on at least a portion of the substrate;
b) jetting a first radiation curable ink-jet ink droplet into the radiation curable liquid layer;
c) curing the radiation curable liquid layer containing the radiation curable ink-jet ink droplet, and
characterized by jetting a second radiation curable ink-jet ink droplet onto the cured layer of step c) and by adjusting the thickness of the radiation curable liquid layer in order to control the resolution of the radiation curable image.

WO 99/29788 A (XAAR) discloses a method of printing on a substrate including directing radiation curable ink jet ink from the printhead of an ink jet printer towards a print-receiving surface of the substrate and, during its travel from the printhead to the substrate and/or after deposition on the substrate, exposing the ink to radiation to cure the ink.

EP 1832633 A1 (FUJIFILM) discloses an ink-jet recording method using an ink-jet recording ink set including at least one recording liquid containing a colorant and a polymerizable compound and an ink spread suppressing liquid containing at least one surfactant and substantially no colorant, the method including forming an image on a recording medium by applying the recording liquid and the ink spread suppressing liquid; and hardening the formed image by applying energy thereto, wherein all of the following conditions (A), (B) and (C) are satisfied:
(A) the surface tension of the ink spread suppressing liquid is smaller than that of at least one recording liquid contained in the ink-jet recording ink set;
(B) at least one of the surfactants contained in the ink spread suppressing liquid satisfies the following relationship: $\gamma^s(0)-\gamma^s(saturated) > 1$ mN/m; and
(C) the surface tension of the ink spread suppressing liquid satisfies the following relationship: $\gamma^s < (\gamma^s(0)+\gamma^s(saturated)^{max})/2$
wherein, $\gamma^s$ represents the surface tension of the ink spread suppressing liquid; $\gamma^s(0)$ represents the surface tension of a liquid obtained by eliminating all surfactants from the ink spread suppressing liquid; $\gamma^s(saturated)$ represents the saturated surface tension of the liquid obtained by eliminating all surfactants from the ink spread suppressing liquid when one of the surfactants contained in the ink spread suppressing liquid is added to the liquid obtained by eliminating all surfactants from the ink spread suppressing liquid until the surface tension thereof becomes saturated; and $\gamma^s(saturated)^{max}$ represents the maximum value of the $\gamma^s(saturated)$ values of all surfactants satisfying the condition (B) contained in the ink spread suppressing liquid.

US 2007182796 (KONICA) discloses an aqueous ink-jet ink including Component (A), Component (B), and Component (C), wherein a content of Component (A) is 20-60% by weight, a content of Component (B) is 10-50% by weight, and the total content ratio of glycols, polyols, and glycerin is 0-20% by weight based on the content of Component (A), and a surface tension of the ink-jet ink is 18-27 mN/m; Component (A): 1,3-dimethyl-2-imidazolidinone or [gamma]-butyrolactone, Component (B): water, and Component (C): a pigment.

Radiation curable inkjet printing has, to our knowledge, not been used for manufacturing plastic bags although it may have been suggested. Several reasons for not introducing inkjet printing for manufacturing plastic bags can be given and include lower printing speed compared to flexography, adhesion problems, lower flexibility of inks, etc. Since inkjet printing is capable of variable data printing and no real limitations in image size exist, it allows personalized printed bags of different sizes. It would be desirable to be able to print images by inkjet printing onto plastic bag substrates, such as thin film polyethylene, exhibiting none of the above problems or at least to a lesser extent.

SUMMARY OF THE INVENTION

Preferred embodiments of the present invention provide an economical and versatile printing method for manufacturing printed plastic bags.

Preferred embodiments of the present invention also provide an inkjet printer suitable for printing on thin polyethylene foil used in manufacturing plastic bags.

These and other preferred embodiments of the present invention will become apparent from the description hereinafter.

It was surprisingly found that an improved adhesion could be realized at a temperature around or above the maximum value for Tan δ of a polymeric substrate.

Preferred embodiments of the present invention are realized with a radiation curable inkjet printing method as defined below.

The preferred embodiments of the present invention are also realized with a single pass inkjet ink printer for executing the above printing method.

Further advantages and preferred embodiments of the present invention will become apparent from the following description.

DETAILED DESCRIPTION OF THE REFERRED EMBODIMENTS

Definitions

The term "dye", as used in disclosing the present invention, means a colorant having a solubility of 10 mg/L or more in the medium in which it is applied and under the ambient conditions pertaining.

The term "pigment" is defined in DIN 55943, herein incorporated by reference, as a colorant that is practically insoluble in the application medium under the pertaining ambient conditions, hence having a solubility of less than 10 mg/L therein.

The term "C.I." is used in disclosing the present application as an abbreviation for Colour Index.

The term "alkyl" means all variants possible for each number of carbon atoms in the alkyl group i.e. for three carbon atoms: n-propyl and isopropyl; for four carbon atoms: n-butyl, isobutyl and tertiary-butyl; for five carbon atoms: n-pentyl, 1,1-dimethyl-propyl, 2,2-dimethylpropyl and 2-methylbutyl etc.

The term "actinic radiation" as used in disclosing the present invention, means electromagnetic radiation capable of initiating photochemical reactions.

The term "ultraviolet radiation" as used in disclosing the present invention, means electromagnetic radiation in the wavelength range of about 100 to about 400 nanometers.

Dynamic Mechanical Analysis

Dynamic mechanical analysis (DMA) is a technique used to characterize the viscoelastic nature of polymers. The method most commonly used today employs forced oscillation. Forced oscillations involve the continued application of a force to the sample. An oscillating force is applied to a sample of material and the resulting displacement of the sample is measured. Solids are tested in a film tension clamp geometry. The sample deforms under the applied strain. From this the stiffness of the sample can be determined, and the sample modulus can be calculated. The modulus is split into the storage modulus, E', i.e. a measure of the energy stored during a cycle, and the loss modulus, E", i.e. a measure of the energy lost. The loss modulus E" has a maximum at the glass transition of the polymer, where it softens from a glassy to a rubbery state taken into account the thickness of the sample. The Tan δ is equal to the ratio E"/E' or loss modulus divided by storage modulus. The smaller the Tan δ, the more viscous the material.

Radiation Curable Inkjet Printing Methods

The radiation curable inkjet printing method for producing printed plastic bags according to a preferred embodiment of the present invention includes the steps of:

a) providing a web-like polymeric substrate having a maximum value for Tan δ between 40° C. and 110° C.;
b) providing a single pass inkjet printer having at least one page-wide printhead or at least one set of staggered printheads, a transporting device arranged to transport the web-like recording medium and a curing device;
c) jetting onto the web-like polymeric substrate having a surface energy $S_{sub}$, a non-aqueous radiation curable inkjet liquid having a surface tension $S_{Liq}$, wherein $S_{Liq}$ is smaller than $S_{Sub}$ by at least 4 mN/m; and
d) curing the radiation curable liquid on the substrate at a surface temperature equal or higher than the temperature of the maximum value for Tan δ and smaller than the melting point of the polymeric recording medium;

wherein the maximum value for Tan δ is determined by dynamic mechanical analysis at a temperature ramp of 3° C./min using forced oscillation with a cycle of 1 second and an amplitude of 100 μm.

The surface temperature of the polymeric substrate during radiation curable inkjet printing method according to a preferred embodiment of the present invention is preferably in the range of 50 to 100° C., more preferably between 70 and 80° C.

In a preferred embodiment, the radiation curable inkjet printing method according to the present invention uses a pigmented radiation curable inkjet ink as the radiation curable liquid.

In another preferred embodiment of the radiation curable inkjet printing method according to the present invention, a pigmented radiation curable inkjet ink is printed on the radiation curable liquid. The surface tension of the pigmented radiation curable inkjet ink is not more than 5 mN/m smaller than the surface tension of the radiation curable liquid.

In a preferred embodiment, the radiation curable inkjet printing method according to the present invention includes a corona treatment of the substrate.

Polymeric Substrates

Any polymeric substrate having a maximum value for Tan δ between 40° C. and 110° C. is suitable as web-like polymeric substrate for use in the preferred embodiments of the present invention. However, plastic shopping bags are most often made of polyethylene. Polyethylene is the most preferred polymeric substrate for use as web-like polymeric substrate in the present invention.

Polyethylene is produced in various low and high densities. These are well-known to a skilled person in manufacturing polyethylene films and foils by their abbreviations, such as UHMWPE, HDPE, PEX, MDPE, LLDPE, LDPE and VLDPE. The latter three are most commonly used for making plastic bags.

LLDPE is defined by a density between 0.915 and 0.925 g/cm$^3$ and is a substantially linear polymer, with significant numbers of short branches, commonly made by copolymerization of ethylene with short-chain alpha-olefins (e.g. 1-butene, 1-hexene, and 1-octene). LLDPE has higher tensile strength than LDPE and exhibits higher impact and puncture resistance than LDPE.

LDPE is defined by a density between 0.910 and 0.940 g/cm$^3$. LDPE has a high degree of short and long chain branching, which means that the chains do not pack into the crystal structure as well. It has therefore less strong intermolecular forces as the instantaneous-dipole induced-dipole attraction is less. This results in a lower tensile strength and increased ductility. LDPE is created by free radical polymerization. The high degree of branches with long chains gives molten LDPE unique and desirable flow properties.

VLDPE is defined by a density between 0.880 and 0.915 g/cm and is a substantially linear polymer, with high levels of short chain branches, commonly made by copolymerization of ethylene with short-chain alpha-olefins (e.g. 1-butene, 1-hexene, and 1-octene). VLDPE is most commonly produced using metallocene catalysts due to the greater co-monomer incorporation exhibited by these catalysts The polymeric substrates for use as web-like polymeric substrate in the preferred embodiments of the present invention are preferably selected from the group consisting of LLDPE, LDPE and VLDPE. Most preferably, the polymeric substrate for use as web-like polymeric substrate in the present invention is LDPE.

The thickness of the polymeric substrate depends on the specific application. For plastic bags, preferably a thickness between 30 and 200 μm, more preferably between 50 and 100 μm and most preferably between 60 to 80 μm is used.

Sometimes, a primer layer is applied to the polymeric substrate for creating a specific effect such as a glossy or a mat finish. As long as the dry thickness is less than 5 μm, preferably less than 3 μm, these primers have no influence on the invention. If the inkjet printing is performed in a wet on wet fashion, i.e. without intermediate curing, it was observed that aqueous primers cannot be used. Preferably the primer used in a preferred embodiment of the invention is a non-aqueous primer.

The primer can be applied beforehand, for example, as a continuous layer by coating or flexographic printing. In a preferred embodiment, the primer is a non-aqueous radiation curable liquid. Then it becomes also possible to jet this radiation curable liquid prior to jetting the inkjet inks using the same single pass inkjet printer.

Corona Treatment

Each polymeric substrate has a specific surface energy. This surface energy can be raised by a surface treatment. Corona treatment is the standard surface treatment method in the plastic film converting industry, because it is safe, economical, and delivers high line speed throughput.

Most plastics, such as polyethylene and polypropylene, have chemically inert and nonporous surfaces leading to a low surface energy.

Corona discharge equipment consists of a high-frequency power generator, a high-voltage transformer, a stationary electrode, and a treater ground roll. Standard utility electrical power is converted into higher frequency power which is then supplied to the treater station. The treater station applies this power through ceramic or metal electrodes over an air gap onto the material's surface.

Generally it is observed that all substrates provide a better bonding surface when they are treated at the time they are produced. This is called "pre-treatment." The effects of corona treatment diminish over time. Therefore many surfaces will require a second "bump" treatment at the time they are converted to ensure bonding with printing inks, coatings, and adhesives.

A corona treatment can be applied in a preferred embodiment of the present invention to the unprimed substrate, but also to the primed substrate.

Inkjet Printers

The radiation curable liquids and inks may be jetted by one or more printing heads ejecting small droplets of ink in a controlled manner through nozzles onto an ink-receiving surface, which is moving relative to the printing head(s).

A preferred printhead for the inkjet printing system is a piezoelectric head. Piezoelectric inkjet printing is based on the movement of a piezoelectric ceramic transducer when a voltage is applied thereto. The application of a voltage changes the shape of the piezoelectric ceramic transducer in the printhead creating a void, which is then filled with ink. When the voltage is again removed, the ceramic expands to its original shape, ejecting a drop of ink from the print head. However the inkjet printing method according to the present invention is not restricted to piezoelectric inkjet printing. Other inkjet printing heads can be used and include various types, such as a continuous type and thermal, electrostatic and acoustic drop on demand type.

At high printing speeds, the inks must be ejected readily from the printing heads, which puts a number of constraints on the physical properties of the ink, e.g. a low viscosity at the jetting temperature, which may vary from 25° C. to 110° C., a surface energy such that the printhead nozzle can form the necessary small droplets, a homogenous ink capable of rapid conversion to a dry printed area, etc.

In most inkjet printers, the inkjet printhead scans back and forth in a transversal direction across the moving ink-receiver surface. The curing device is most often attached to both sides of the printhead. Printing in such a manner at high speed, the curing device does not cause any significant warm-up of the substrate surface.

In a "single pass printing process", the printing is accomplished by using page wide inkjet printing heads or multiple staggered inkjet printing heads which cover the entire width of the ink-receiver surface. In a single pass printing process the inkjet printing heads remain stationary and the ink-receiver surface is transported under the inkjet printing head(s). All curable liquids and inks have then to be cured instantaneously downstream of the printing area by a radiation curing device. This radiation curing device requires usually high power UV lamps also producing a large amount of heat which usually is removed by ventilation or water cooling. In a preferred embodiment of the present invention the heat produced by the radiation curing device is preferably used to increase the surface temperature of the substrate.

The single pass inkjet printer according to a preferred embodiment of the present invention includes:

a) a transporting device arranged to transport a web-like polymeric substrate having a maximum value for Tan δ between 40° C. and 110° C.; and
b) a curing device arranged to invoke at 1 cm above the substrate in the curing zone a temperature in the range of 50 to 100° C.

Transporting devices arranged to transport a web-like polymeric substrate having a maximum value for Tan δ between 40° C. and 100° C. are well-known for a skilled person in printing presses for flexographic printing on webs of thin flexible foils. U.S. Pat. No. 7,033,077 B (TAYLOR) discloses in FIGS. 11 and 12a flexographic printing press for printing on plastic sheeting for manufacturing sealable bags.

In a preferred embodiment of the present invention preferably all the heat for increasing the surface temperature of the substrate is delivered by the curing device. The substrate can also be heated by e.g. a heated drum, but usually this poses large difficulties for realizing a reliable transport of a web-like polymeric substrate having a maximum value for Tan δ between 40° C. and 110° C.

Curing Device

Curable liquids and inks according to the present invention are cured by exposing them to actinic radiation. The curable liquids and inks include a photoinitiator which allows radiation curing preferably by ultraviolet radiation.

In a preferred embodiment a static fixed radiation source is employed. The source of radiation arranged is preferably an elongated radiation source extending transversely across the ink-receiver surface to be cured and adjacent to the transverse path of the printhead so that the subsequent rows of images formed by the printhead are passed, stepwise or continually, beneath that radiation source. At least part of the radiation emitted is absorbed by the photo-initiator or photo-initiator system.

Many light sources exist in UV radiation, including a high or low pressure mercury lamp, a cold cathode tube, a black light, an ultraviolet LED, an ultraviolet laser, and a flash light. Of these, the preferred source is one exhibiting a relatively long wavelength UV-contribution having a dominant wavelength of 300-400 nm. Specifically, a UV-A light source is preferred due to the reduced light scattering therewith resulting in more efficient interior curing.

UV radiation is generally classed as UV-A, UV-B, and UV-C as follows:
UV-A: 400 nm to 320 nm
UV-B: 320 nm to 290 nm
UV-C: 290 nm to 100 nm.

Furthermore, it is possible to cure the image using, consecutively or simultaneously, two light sources of differing wavelength or illuminance. For example, the first UV-source can be selected to be rich in UV-C, in particular in the range of 260 nm-200 nm. The second UV-source can then be rich in UV-A, e.g. a gallium-doped lamp, or a different lamp high in both UV-A and UV-B. Or, for example, the first UV-source can be selected to be rich in UV-A, e.g. a lead-doped lamp and the second UV-source can then be rich in UV-C, e.g. a non-doped lamp. The use of two UV-sources has been found to have advantages e.g. a fast curing speed.

However, in a preferred embodiment of the present invention, a radiation source is preferably chosen capable of producing enough heat to invoke on the polymeric substrate, a surface temperature preferably at least 50° C. and up to 100° C.

For facilitating curing, the inkjet printer often includes one or more oxygen depletion units. The oxygen depletion units place a blanket of nitrogen or other relatively inert gas (e.g. $CO_2$), with adjustable position and adjustable inert gas concentration, in order to reduce the oxygen concentration in the curing environment. Residual oxygen levels are usually maintained as low as 200 ppm, but are generally in the range of 200 ppm to 1200 ppm.

Curable Liquids and Inks

The curable liquids and inks used in the radiation curable printing method according to a preferred embodiment of the present invention is preferably a UV radiation curable inkjet liquid or ink.

The curable liquids and inks preferably include at least one photoinitiator.

The curable liquids and inks are preferably part of an inkjet ink set including at least one ink containing one or more colorants, preferably one or more colour pigments. The curable inkjet ink set preferably includes at least one yellow curable inkjet ink (Y), at least one cyan curable inkjet ink (C) and at least one magenta curable inkjet ink (M) and preferably also at least one black curable inkjet ink (K). The curable CMYK inkjet ink set may also be extended with extra inks such as red, green, blue, and/or orange to further enlarge the colour gamut of the image. The CMYK ink set may also be extended by the combination of full density and light density inks of both colour inks and/or black inks to improve the image quality by lowered graininess.

The curable liquid or ink may further also contain at least one inhibitor.

The curable liquid or ink may further also contain at least one surfactant.

The curable liquid or ink is a non-aqueous inkjet liquid or ink. The term "non-aqueous" refers to a liquid carrier which should contain no water. However sometimes a small amount, generally less than 5 wt % of water based on the total weight of the ink, can be present. This water was not intentionally added but came into the formulation via other components as a contamination, such as for example polar organic solvents. Higher amounts of water than 5 wt % tend to make the non-aqueous inkjet inks instable, preferably the water content is less than 1 wt % based on the total weight dispersion medium and most preferably no water at all is present.

The curable liquid or ink preferably does not contain an evaporable component such as an organic solvent. But sometimes it can be advantageous to incorporate a small amount of an organic solvent to improve adhesion to the surface of a substrate after UV-curing. In this case, the added solvent can be any amount in the range that does not cause problems of solvent resistance and VOC, and preferably 0.1-10.0 wt %, and particularly preferably 0.1-5.0 wt %, each based on the total weight of the curable ink.

The pigmented curable ink preferably contains a dispersant, more preferably a polymeric dispersant, for dispersing the pigment. The pigmented curable ink may contain a dispersion synergist to improve the dispersion quality of the ink. Preferably, at least the magenta ink contains a dispersion synergist. A mixture of dispersion synergists may be used to further improve dispersion stability.

The viscosity of the ink is preferably smaller than 100 mPa·s at 30° C. and at a shear rate of 100 s$^{-1}$. The viscosity of the inkjet ink is preferably smaller than 30 mPa·s, more preferably lower than 15 mPa·s, and most preferably between 2 and 10 mPa·s at a shear rate of 100 s$^{-1}$ and a jetting temperature between 10 and 70° C.

The polymerizable compounds used in the curable ink, especially for food packaging applications, are preferably purified compounds having no or almost no impurities, more particularly no toxic or carcinogenic impurities. The impurities are usually derivative compounds obtained during synthesis of the polymerizable compound. Sometimes, however, some compounds may be added deliberately to pure polymerizable compounds in harmless amounts, for example, polymerization inhibitors or stabilizers.

Photoinitiators

The curable liquids and inks used in the radiation curable printing method according to a preferred embodiment of the present invention preferably contain a photoinitiator or photoinitiator system such as, for example, one or more photo-initiators and one or more co-initiators. The photoinitiator or photoinitiator system absorbs light and is responsible for the production of initiating species, i.e. free radicals which induce the polymerization of monomers, oligomers and polymers and with polyfunctional monomers and oligomers thereby also induce cross-linking.

Irradiation with actinic radiation may be realized in two steps by changing wavelength or intensity. In such cases it is preferred to use 2 types of photoinitiator together.

Free radical photoinitiators can act as a Norrish type I or a Norrish type II initiator. Tertiary amines are today admixed to free radical polymerizable radiation curable formulations for two main reasons:
i) They counteract air inhibition, provided that the particular amine contains abstractable α-hydrogens, by formation of radicals, which can participate and trigger radical polymerisation of acrylic groups. Tertiary amines can therefore be used together with Norrish type I photoinitiators to reduce air inhibition and thereby increase cure speed; and
ii) They can act as co-initiators together with ketones, for example, of the benzophenone type, wherein the excited keto groups abstract a hydrogen from the amine, whereby radicals are formed promoting radical polymerisation of acrylic groups and the like. This is the so called Norrish type II of photopolymerization.

A suitable Norrish type I-photoinitiator is selected from the group consisting of benzoinethers, benzil ketals, α,α-dialkoxyacetophenones, α-hydroxyalkylphenones, α-aminoalkylphenones, acylphosphine oxides, acylphosphine sulphides, α-haloketones, α-halosulfones and phenylglyoxalates.

A suitable Norrish type II-initiator is selected from the group consisting of benzophenones, thioxanthones, 1,2-diketones and anthraquinones.

Other photoinitiators suitable for the photoinitiating functional groups in preparing diffusion hindered photoinitiators are disclosed by CRIVELLO, J. V., et al.; Chemistry & technology of UV & EB Formulation for Coatings, Inks & Paints. Volume III: Photoinitiators for Free Radical, Cationic & Anionic Photopolymerisation, 2nd edition, John Wiley & Sons Ltd in association with SITA Technology Ltd, London, UK, 1998 edited by Dr. G. Bradley; ISBN 0471 978922, page 287-294.

Specific examples of photo-initiators may include, but are not limited to, the following compounds or combinations thereof: benzophenone and substituted benzophenones, 1-hydroxycyclohexyl phenyl ketone, thioxanthones such as iso-propylthioxanthone, 2-hydroxy-2-methyl-1-phenylpropan-1-one, 2-benzyl-2-dimethylamino-(4-morpholinophenyl) butan-1-one, benzil dimethylketal, bis(2,6-dimethylbenzoyl)-2,4,4-trimethylpentylphosphine oxide, 2,4,6trimethylbenzoyldiphenylphosphine oxide, 2-methyl-1-[4-(methylthio)phenyl]-2-morpholinopropan-1-one, 2,2-dimethoxy-1,2-diphenylethan-1-one or 5,7-diiodo-3-butoxy-6-fluorone, diphenyliodonium fluoride and triphenylsulfonium hexafluophosphate.

Suitable commercial photo-initiators include IRGACURE™ 184, IRGACURE™ 500, IRGACURE™ 907, IRGACURE™ 369, IRGACURE™ 1700, IRGACURE™ 651, IRGACURE™ 819, IRGACURE™ 1000, IRGACURE™ 1300, IRGACURE™ 1870, DAROCUR™ 1173, DAROCUR™ 2959, DAROCUR™ 4265 and DAROCUR™ ITX available from CIBA SPECIALTY CHEMICALS, Lucerin TPO available from BASF AG, ESACURE™ KT046, ESACURE™ KIP150, ESACURE™ KT37 and ESACURE™ EDB available from LAMBERTI, H-NU™ 470 and H-NU™ 470X available from SPECTRA GROUP Ltd.

Suitable cationic photo-initiators include compounds, which form aprotic acids or Bronstead acids upon exposure to ultraviolet and/or visible light sufficient to initiate polymerization. The photo-initiator used may be a single compound, a mixture of two or more active compounds, or a combination of two or more different compounds, i.e. co-initiators. Non-limiting examples of suitable cationic photo-initiators are aryldiazonium salts, diaryliodonium salts, triarylsulphonium salts, triarylselenonium salts and the like.

In order to increase the photosensitivity further, the curable inkjet liquids and inks may additionally contain co-initiators. For example, the combination of titanocenes and trichloromethyl-s-triazines, of titanocenes and ketoxime ethers and of acridines and trichloromethyl-s-triazines is known. A further increase in sensitivity can be achieved by adding dibenzalacetone or amino acid derivatives. The amount of co-initiator or co-initiators is in general from 0.01 to 20 wt %, preferably from 0.05 to 10 wt %, based in each case on the total weight of the curable inkjet ink.

Suitable examples of co-initiators can be categorized in 4 groups:
(1) tertiary aliphatic amines such as methyldiethanolamine, dimethylethanolamine, triethanolamine, triethylamine and N-methylmorpholine;
(2) aromatic amines such as amylparadimethylaminobenzoate, 2-n-butoxyethyl-4-(dimethylamino) benzoate, 2-(dimethylamino)ethylbenzoate, ethyl-4-(dimethylamino)benzoate, and 2-ethylhexyl-4-(dimethylamino) benzoate;
(3) (meth)acrylated amines such as dialkylamino alkyl(meth) acrylates (e.g., diethylaminoethylacrylate) or N-morpholinoalkyl-(meth)acrylates (e.g., N-morpholinoethyl-acrylate); and
(4) amides or ureas.

The preferred co-initiators are aminobenzoates.

The curable inkjet liquids and inks may contain a photoinitiator system containing one or more photo-initiators and one or more sensitizers that transfer energy to the photo-initiator(s). Suitable sensitizers include photoreducible xanthene, fluorene, benzoxanthene, benzothioxanthene, thiazine, oxazine, coumarin, pyronine, porphyrin, acridine, azo, diazo, cyanine, merocyanine, diarylmethyl, triarylmethyl, anthraquinone, phenylenediamine, benzimidazole, fluoro- chrome, quinoline, tetrazole, naphthol, benzidine, rhodamine, indigo and/or indanthrene dyes. The amount of the sensitizer is in general from 0.01 to 15 wt %, preferably from 0.05 to 5 wt %, based in each case on the total weight of the curable pigment inkjet ink.

A preferred initiator system is 2,2'-bis(o-chlorophenyl)-4, 4',5,5'-tetraphenyl-(7CI,8CI) 4,4'-Bi-4H-imidazole corresponding to the chemical formula:

in the presence of a co-initiator such as 2-mercapto benzoxazole.

Another preferred type of initiator is an oxime ester. A suitable example has as chemical formula:

A preferred amount of initiator is 0.3-50 wt % of the total weight of the curable liquid, and more preferably 1-15 wt % of the total weight of the curable pigment inkjet ink.

Irradiation with actinic radiation may be realized in two steps by changing wavelength or intensity. In such cases it is preferred to use 2 types of photo-initiator together.

Inhibitors

The curable liquids and inks used in the radiation curable printing method according to a preferred embodiment of the present invention may contain a polymerization inhibitor. Suitable polymerization inhibitors include phenol type antioxidants, hindered amine light stabilizers, phosphor type antioxidants, hydroquinone monomethyl ether commonly used in (meth)acrylate monomers, and hydroquinone, t-butylcatechol, pyrogallol, 2,6-di-tert.butyl-4-methylphenol may also be used.

Suitable commercial inhibitors are, for example, SUMILIZER™ GA-80, SUMILIZER™ GM and SUMILIZER™ GS produced by Sumitomo Chemical Co. Ltd.; GENORAD™ 16, GENORAD™ 18 and GENORAD™ 20 from Rahn AG; IRGASTAB™ UV10 and IRGASTAB™ UV22, TINUVIN™ 460 and CGS20 from Ciba Specialty Chemicals; FLOORSTAB™ UV range (UV-1, UV-2, UV-5 and UV-8) from Kromachem Ltd, ADDITOL™ S range (S100, 5110, 5120 and 5130) from Cytec Surface Specialties.

The inhibitor is preferably a polymerizable inhibitor.

Since excessive addition of these polymerization inhibitors may lower the sensitivity to curing, it is preferred that the amount capable of preventing polymerization is determined prior to blending. The amount of a polymerization inhibitor is preferably lower than 5 wt %, more preferably lower than 3 wt % of the total ink or liquid.

Surfactants

The curable liquids and inks used in the radiation curable printing method according to a preferred embodiment of the present invention may contain a surfactant.

The surfactant(s) can be anionic, cationic, non-ionic, or zwitter-ionic and are usually added in a total quantity less than 20 wt % based on the total weight of the inkjet ink and particularly in a total less than 10 wt % based on the total weight of the inkjet ink.

Suitable surfactants include fluorinated surfactants, fatty acid salts, ester salts of a higher alcohol, alkylbenzene sulphonate salts, sulphosuccinate ester salts and phosphate ester salts of a higher alcohol (for example, sodium dodecylbenzenesulphonate and sodium dioctylsulphosuccinate), ethylene oxide adducts of a higher alcohol, ethylene oxide adducts of an alkylphenol, ethylene oxide adducts of a polyhydric alcohol fatty acid ester, and acetylene glycol and ethylene oxide adducts thereof (for example, polyoxyethylene nonylphenyl ether, and SURFYNOL™ 104, 104H, 440, 465 and TG available from AIR PRODUCTS & CHEMICALS INC.).

For non-aqueous inkjet inks preferred surfactants are selected from fluoro surfactants (such as fluorinated hydrocarbons) and silicone surfactants. The silicones are typically siloxanes and can be alkoxylated, polyether modified, polyether modified hydroxy functional, amine modified, epoxy modified and other modifications or combinations thereof. Preferred siloxanes are polymeric, for example polydimethylsiloxanes.

In radiation curable inkjet inks a fluorinated or silicone compound may be used as a surfactant, however, a cross-linkable surfactant would be preferred. It is therefore preferred to use a copolymerizable monomer having surface-active effects, for example, polyacrylate copolymers, silicone modified acrylates, silicone modified methacrylates, acrylated siloxanes, polyether modified acrylic modified siloxanes, fluorinated acrylates, and fluorinated methacrylates; these acrylates can be mono-, di-, tri- or higher functional (meth)acrylates.

Surfactants are known for use in inkjet inks to reduce the surface tension of the ink and to reduce the contact angle on the substrate, i.e. to improve the wetting of the substrate by the ink. On the other hand, the jettable fluid must meet stringent performance criteria in order to be adequately jettable with high precision, reliability and during an extended period of time. To achieve both wetting of the substrate by the ink and high jetting performance, typically, the surface tension of the ink is reduced by the addition of one or more surfactants. In the case of curable inkjet inks, however, the surface tension of the inkjet ink is not only determined by the amount and type of surfactant, but also by the polymerizable compounds, the polymeric dispersants and other additives in the ink composition.

Depending upon the application a surfactant can be used with a high, low or intermediate dynamic surface tension. Silicone surfactants are generally known to have low dynamic surface tensions while fluorinated surfactants are known to have higher dynamic surface tensions.

Useful commercially available fluorinated surfactants are for example the ZONYL™ range of fluoro-surfactants from DUPONT and the FLUORAD™ range of fluoro-surfactants from 3M. Other fluorinated surfactants are e.g. described in EP 1412438 A (3M).

Silicone surfactants are often preferred in curable inkjet inks, especially the reactive silicone surfactants, which are able to be polymerized together with the polymerizable compounds during the curing step.

Useful commercially available silicone surfactants are often polysiloxane surfactants, especially polyether modified polysiloxanes, preferably with one or more acrylate function in order to become polymerizable.

Examples of useful commercial silicone surfactants are those supplied by BYK CHEMIE GMBH (including BYK™-302, 307, 310, 331, 333, 341, 345, 346, 347, 348, UV3500, UV3510 and UV3530), those supplied by TEGO CHEMIE SERVICE (including Tego RAD™ 2100, 2200N, 2250, 2300, 2500, 2600 and 2700), EBECRYL™ 350 a polysiloxone diacrylate and EBECRYL™ 1360 a polysiloxane hexaacrylate from CYTEC INDUSTRIES BV and EFKA™-3000 series (including EFKA™-3232 and EFKA™-3883) from EFKA CHEMICALS B.V.

Colorants

The curable inks used in the radiation curable printing method according to a preferred embodiment of the present invention preferably may contain a colorant. Colorants used in the curable inks may be dyes, pigments or a combination thereof. Organic and/or inorganic pigments may be used. The colorant is preferably a pigment or a polymeric dye, most preferably a pigment.

The pigments may be black, white, cyan, magenta, yellow, red, orange, violet, blue, green, brown, mixtures thereof, and the like. This colour pigment may be chosen from those disclosed by HERBST, Willy, et al. Industrial Organic Pigments, Production, Properties, Applications. 3rd edition. Wiley—VCH, 2004. ISBN 3527305769.

Particular preferred pigments are C.I. Pigment Yellow 1, 3, 10, 12, 13, 14, 17, 55, 65, 73, 74, 75, 83, 93, 97, 109, 111, 120, 128, 138, 139, 150, 151, 154, 155, 175, 180, 181, 185, 194 and 213.

Particular preferred pigments are C.I. Pigment Red 17, 22, 23, 41, 48:1, 48:2, 49:1, 49:2, 52:1, 57:1, 81:1, 81:3, 88, 112, 122, 144, 146, 149, 169, 170, 175, 176, 184, 185, 188, 202, 206, 207, 210, 216, 221, 248, 251, 254, 255, 264, 266, 270 and 272.

Particular preferred pigments are C.I. Pigment Violet 1, 2, 19, 23, 32, 37 and 39.

Particular preferred pigments are C.I. Pigment Blue 15:1, 15:2, 15:3, 15:4, 15:6, 16, 56, 61 and (bridged) aluminium phthalocyanine pigments.

Particular preferred pigments are C.I. Pigment Orange 5, 13, 16, 34, 40, 43, 59, 66, 67, 69, 71 and 73.

Particular preferred pigments are C.I. Pigment Green 7 and 36.

Particular preferred pigments are C.I. Pigment Brown 6 and 7.

Suitable pigments include mixed crystals of the above particular preferred pigments. Mixed crystals are also referred to as solid solutions. For example, under certain conditions different quinacridones mix with each other to form solid solutions, which are quite different from both physical mixtures of the compounds and from the compounds themselves. In a solid solution, the molecules of the components enter into the same crystal lattice, usually, but not always, that of one of the components. The x-ray diffraction pattern of the resulting crystalline solid is characteristic of that solid and can be clearly differentiated from the pattern of a physical mixture of the same components in the same proportion. In such physical mixtures, the x-ray pattern of each of the components can be distinguished, and the disappearance of many of these lines is one of the criteria of the formation of solid solutions. A commercially available example is Cinquasia Magenta RT-355-D from Ciba Specialty Chemicals.

Carbon black is preferred as a black pigment. Suitable black pigments include carbon blacks such as Pigment Black 7 (e.g. Carbon Black MA8® from MITSUBISHI CHEMICAL), REGAL® 400R, MOGUL® L, ELFTEX® 320 from CABOT Co., or Carbon Black FW18, Special Black 250, Special Black 350, Special Black 550, PRINTEX® 25, PRINTEX® 35, PRINTEX® 55, PRINTEX® 90, PRINTEX® 150T from DEGUSSA. Additional examples of suitable pigments are disclosed in U.S. Pat. No. 5,389,133 (XEROX).

It is also possible to make mixtures of pigments. For example, in some inkjet ink application a neutral black inkjet ink is preferred and can be obtained e.g. by mixing a black pigment and a cyan pigment into the ink. Also pigments may be combined to enlarge the colour gamut of an ink set. The inkjet application may also require one or more spot colours. Silver and gold are often desired colours for making a product more attractive by giving it an exclusive appearance.

Also non-organic pigments may be present in the inks. Suitable pigments are C.I. Pigment Metal 1, 2 and 3. Illustrative examples of the inorganic pigments include titanium oxide, barium sulfate, calcium carbonate, zinc oxide, lead sulfate, yellow lead, zinc yellow, red iron oxide (III), cadmium red, ultramarine blue, prussian blue, chromium oxide green, cobalt green, amber, titanium black and synthetic iron black. However, care should be taken to prevent migration and extraction of heavy metals in food application. In a preferred embodiment no pigments are used which contain a heavy metal selected from the group consisting of arsenic, lead, mercury and cadmium.

Pigment particles in inkjet ink should be sufficiently small to permit free flow of the ink through the inkjet-printing device, especially at the ejecting nozzles. It is also desirable to use small particles for maximum colour strength and to slow down sedimentation.

The numeric average pigment particle size is preferably between 0.050 and 1 µm, more preferably between 0.070 and 0.300 µm and particularly preferably between 0.080 and 0.200 µm. Most preferably, the numeric average pigment particle size is no larger than 0.150 µm. An average particle size smaller than 0.050 µm is less desirable for decreased light-fastness, but mainly also because very small pigment particles or individual pigment molecules thereof may still be extracted in food packaging applications.

The numeric average pigment particle size of pigment particles is best determined with a Brookhaven Instruments Particle Sizer BI90plus based upon the principle of dynamic light scattering. The ink is then diluted, for example, with ethyl acetate to a pigment concentration of 0.002 wt %. The measurement settings of the BI90plus are: 5 runs at 23° C., angle of 90°, wavelength of 635 nm and graphics=correction function.

In the case of a white curable ink, preferably a pigment with a refractive index greater than 1.60, preferably greater than 2.00, more preferably greater than 2.50 and most preferably greater than 2.60 is used. The white pigments may be employed singly or in combination.

Preferably titanium dioxide is used for the pigment with a refractive index greater than 1.60. Titanium oxide occurs in the crystalline forms of anatase type, rutile type and brookite type. The anatase type has a relatively low density and is easily ground into fine particles, while the rutile type has a relatively high refractive index, exhibiting a high covering power. Either one of these is usable in this invention. It is preferred to make the most possible use of characteristics and to make selections according to the use thereof. The use of the anatase type having a low density and a small particle size can achieve superior dispersion stability, ink storage stability and ejectability. At least two different crystalline forms may be used in combination. The combined use of the anatase type and the rutile type which exhibits a high coloring power can reduce the total amount of titanium oxide, leading to improved storage stability and ejection performance of ink.

For surface treatment of the titanium oxide, an aqueous treatment or a gas phase treatment is applied, and an alumina-silica treating agent is usually employed. Untreated-, alumina treated- or alumina-silica treated-titanium oxide are employable.

The numeric average particle diameter of the titanium oxide or other white pigments is preferably from 50 to 500 nm, more preferably from 150 to 400 nm, and most preferably from 200 to 350 nm. Sufficient hiding power cannot be obtained when the average diameter is less than 50 nm, and the storage ability and the jet-out suitability of the ink tend to be degraded when the average diameter exceeds 500 nm. The determination of the numeric average particle diameter is best performed by photon correlation spectroscopy at a wavelength of 633 nm with a 4 mW HeNe laser on a diluted sample of the pigmented inkjet ink. A suitable particle size analyzer used was a Malvern™ nano-S available from Goffin-Meyvis. A sample can be, for example, be prepared by addition of one drop of ink to a cuvet containing 1.5 mL ethyl acetate and mixed until a homogenous sample was obtained. The measured particle size is the average value of 3 consecutive measurements consisting of 6 runs of 20 seconds.

Generally pigments are stabilized in the dispersion medium by dispersing agents, such as polymeric dispersants or surfactants. However, the surface of the pigments can be modified to obtain so-called "self-dispersible" or "self-dispersing" pigments, i.e. pigments that are dispersible in the dispersion medium without dispersants.

The pigment is preferably used in a pigment dispersion used for preparing inkjet inks in an amount of 10 to 40 wt %, more preferably of 15 to 30 wt % based on the total weight of the pigment dispersion. In a curable inkjet ink the pigment is preferably present in an amount of 0.1 to 20 wt %, preferably 1 to 10 wt % based on the total weight of the inkjet ink.

Dispersants

The dispersant is preferably a polymeric dispersant. Typical polymeric dispersants are copolymers of two monomers but may contain three, four, five or even more monomers. The properties of polymeric dispersants depend on both the nature of the monomers and their distribution in the polymer. Suitable copolymeric dispersants have the following polymer compositions:

statistically polymerized monomers (e.g. monomers A and B polymerized into ABBAABAB);

alternating polymerized monomers (e.g. monomers A and B polymerized into ABABABAB);

gradient (tapered) polymerized monomers (e.g. monomers A and B polymerized into AAABAABBABBB);

block copolymers (e.g. monomers A and B polymerized into AAAAABBBBBB) wherein the block length of each of the blocks (2, 3, 4, 5 or even more) is important for the dispersion capability of the polymeric dispersant;

graft copolymers (graft copolymers consist of a polymeric backbone with polymeric side chains attached to the backbone); and mixed forms of these polymers, e.g. blocky gradient copolymers.

Suitable polymeric dispersants are listed in the section on polymeric dispersants in EP 1790696 A (AGFA) incorporated herein as a specific reference.

The polymeric dispersant has preferably a polymerization degree DP between 5 and 1,000, more preferably between 10 and 500 and most preferably between 10 and 100.

The polymeric dispersant has preferably a number average molecular weight Mn between 500 and 30,000, more preferably between 1,500 and 10,000.

The polymeric dispersant has preferably a weight average molecular weight Mw smaller than 100,000, more preferably smaller than 50000 and most preferably smaller than 30,000.

The polymeric dispersant has preferably a polymeric dispersity PD smaller than 2, more preferably smaller than 1.75 and most preferably smaller than 1.5.

Commercial examples of polymeric dispersants are the following:

DISPERBYK™ dispersants available from BYK CHEMIE GMBH;

SOLSPERSE™ dispersants available from NOVEON;

TEGO™ DISPERS™ dispersants from DEGUSSA;

EDAPLAN™ dispersants from MUNZING CHEMIE;

ETHACRYL™ dispersants from LYONDELL;

GANEX™ dispersants from ISP;

DISPEX™ and EFKA™ dispersants from CIBA SPECIALTY CHEMICALS INC;

DISPONER™ dispersants from DEUCHEM; and

JONCRYL™ dispersants from JOHNSON POLYMER.

Particularly preferred polymeric dispersants include SOLSPERSE™ dispersants from NOVEON, EFKA™ dispersants from CIBA SPECIALTY CHEMICALS INC and DISPERBYK™ dispersants from BYK CHEMIE GMBH.

Particularly preferred dispersants for UV-curable pigmented dispersions are SOLSPERSE™ 32000, 35000 and 39000 dispersants from NOVEON.

The polymeric dispersant is preferably used in an amount of 2 to 600 wt %, more preferably 5 to 200 wt % based on the weight of the pigment.

Preparation of Curable Inks

The average particle size and distribution is an important feature for inkjet inks. The inkjet ink may be prepared by precipitating or milling the pigment in the dispersion medium in the presence of the dispersant.

Mixing apparatuses may include a pressure kneader, an open kneader, a planetary mixer, a dissolver, and a Dalton Universal Mixer. Suitable milling and dispersion apparatuses are a ball mill, a pearl mill, a colloid mill, a high-speed disperser, double rollers, a bead mill, a paint conditioner, and triple rollers. The dispersions may also be prepared using ultrasonic energy.

Many different types of materials may be used as milling media, such as glasses, ceramics, metals, and plastics. In a preferred embodiment, the grinding media can include particles, preferably substantially spherical in shape, e.g. beads consisting essentially of a polymeric resin or yttrium stabilized zirconium oxide beads.

In the process of mixing, milling and dispersion, each process is performed with cooling to prevent build up of heat, and for radiation curable inkjet inks as much as possible under light conditions in which actinic radiation has been substantially excluded.

The inkjet ink may contain more than one pigment, the inkjet ink may be prepared using separate dispersions for each pigment, or alternatively several pigments may be mixed and co-milled in preparing the dispersion.

The dispersion process can be carried out in a continuous, batch or semi-batch mode.

The preferred amounts and ratios of the ingredients of the mill grind will vary widely depending upon the specific materials and the intended applications. The contents of the milling mixture include the mill grind and the milling media. The mill grind includes pigment, polymeric dispersant and a liquid carrier. For inkjet inks, the pigment is usually present in the mill grind at 1 to 50 wt %, excluding the milling media. The weight ratio of pigment over polymeric dispersant is 20:1 to 1:2.

The milling time can vary widely and depends upon the pigment, selected mechanical devices and residence conditions, the initial and desired final particle size, etc. In a preferred embodiment of the present invention pigment dispersions with an average particle size of less than 100 nm may be prepared.

After milling is completed, the milling media is separated from the milled particulate product (in either a dry or liquid dispersion form) using conventional separation techniques, such as by filtration, sieving through a mesh screen, and the like. Often the sieve is built into the mill, e.g. for a bead mill. The milled pigment concentrate is preferably separated from the milling media by filtration.

In general it is desirable to make the inkjet inks in the form of a concentrated mill grind, which is subsequently diluted to the appropriate concentration for use in the inkjet printing system. This technique permits preparation of a greater quantity of pigmented ink from the equipment. By dilution, the inkjet ink is adjusted to the desired viscosity, surface tension, colour, hue, saturation density, and print area coverage for the particular application.

EXAMPLES

Materials
LDPE foil is an abbreviation used for a white Noteworthy LDPE Foil having a thickness of 75 µm manufactured by NOTEWORTHY, USA.
:AGORIX Cyan is a cyan non-aqueous free radical radiation curable inkjet ink from AGFA GRAPHICS, Belgium.
Measurement
1. DMA
Dynamical mechanical analysis is performed using a DMA2980 Dynamic Mechnical Analyzer (from TA INSTRUMENTS, USA) at a temperature ramp of 3° C./min at which the sample is deformed every second at an amplitude of 100 µm. During every cycle, the response is measured and decomposed in an elastic component (storage modulus E') and a viscous component (loss modulus E"). The ratio between loss modulus and storage modulus gives the value for Tan δ.
2. DSC
Differential Scanning Calorimetry is performed with a DSC Q1000 (heat flux principle) using a RCS-cooling unit from TA INSTRUMENTS, USA.
Using a perforator a sample is taken from the foil. The sample is put into an aluminium sampleholder (diameter 6.6 mm) from TA-Instruments and sealed by an aluminium lid. The sample is then heated in an inert atmosphere (50 ml/min nitrogen flow) at 20° C./min from −90° C. to 150° C.
3. Curing Degree
The curing degree is tested on a coating immediately after curing with UV light. The cured coating is rubbed with a Qtip. When the surface is not damaged, the coating is considered to be fully cured. When some of the cured coating can be damaged, the coating is only partly cured. When the whole cured coating is damaged, the coating is not cured.
4. Adhesion Test
The adhesion of the cured coating onto the substrate was tested with a tape. A black tape Tesa 4104/04 from TESA AG, Germany was taped onto the coating and the tape was removed immediately thereafter by hand.

Table 1 shows the evaluation scale used for the adhesion quality.

TABLE 1

| % of coating removed by the tape | Adhesion |
| --- | --- |
| 0 to 10% | Excellent |
| 10 to 20% | Acceptable |
| >20% | Not OK |

5. Surface Tension
The surface tension of the curable liquids and inks were measured with a KRUSS tensiometer K9 from KRUSS GmbH, Germany at 25° C. after 60 seconds.
6. Surface Energy
The surface energy of a substrate was measured using a set of test pens, containing fluids of a defined surface tension from 30 to 44 mN/m, available from ARCOTEST, Germany.
A surface energy measurement result of 36-38 mJ/m$^2$ (=mN/m) means that the red ink of a test pen with a surface tension of 36 mN/m results in spreading of the red ink, while the red ink of a test pen with a surface tension of 38 mN/m results did not result in spreading of the red ink.
7. Gloss at 60°
The gloss was measured at an angle of 60° with a REFO 60 available from Dr. LANGE GmbH, Germany.

Example 1

Figure 1:
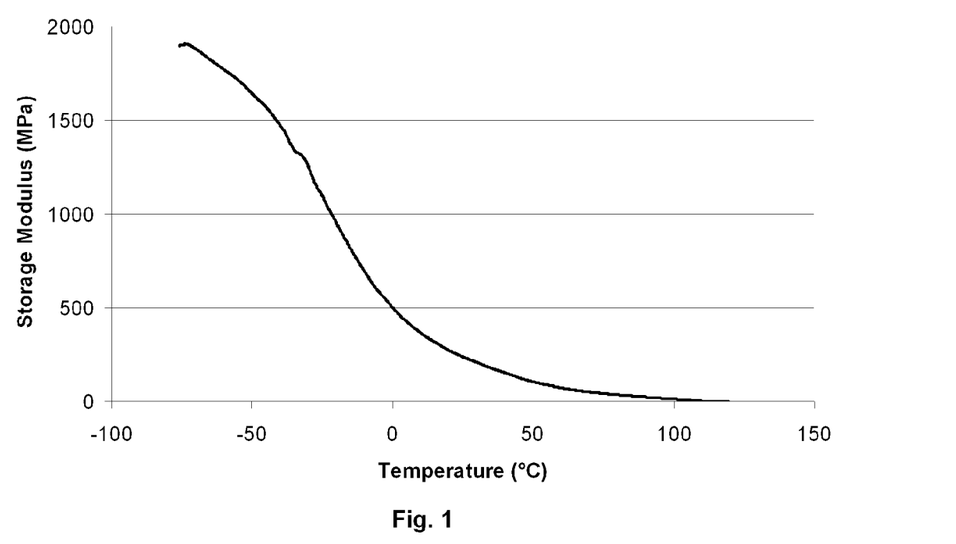
FIG. 1 is a graph showing the relation between the storage modulus and the temperature of a polyethylene substrate in a dynamic mechanic analysis.
Figure 2:
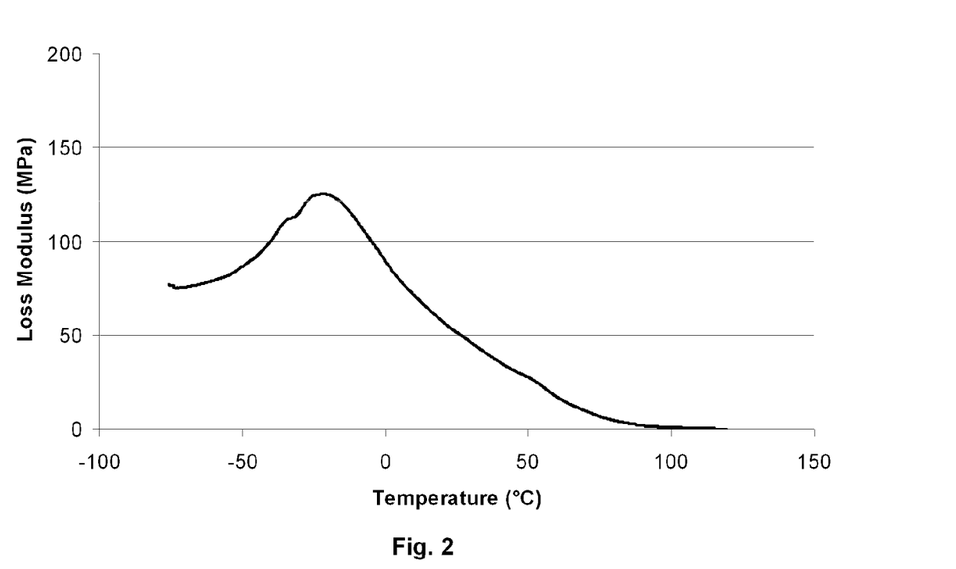
FIG. 2 is a graph showing the relation between the loss modulus and the temperature of the same polyethylene substrate of FIG. 1 in a dynamic mechanic analysis.
Figure 3:
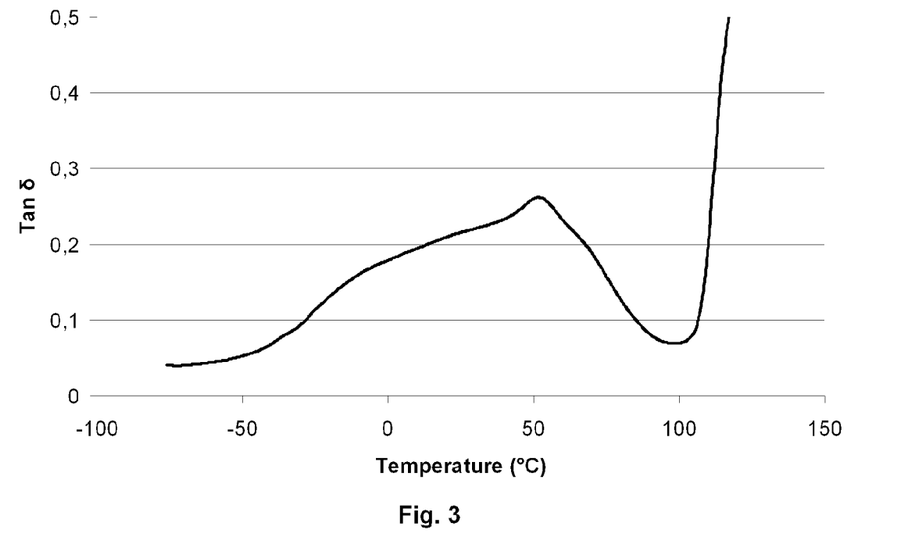
FIG. 3 is a graph showing the relation between the Tan δ and the temperature of the same polyethylene substrate of FIG. 1 in a dynamic mechanic analysis.
Figure 4:
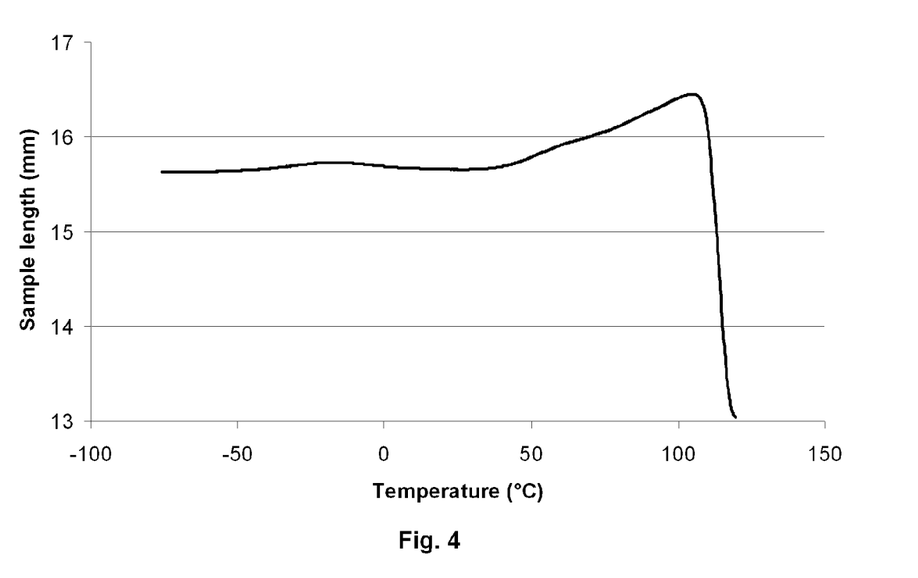
FIG. 4 is a graph showing the relation between the sample length and the temperature of the same polyethylene substrate of FIG. 1 in a dynamic mechanic analysis.
Figure 5:
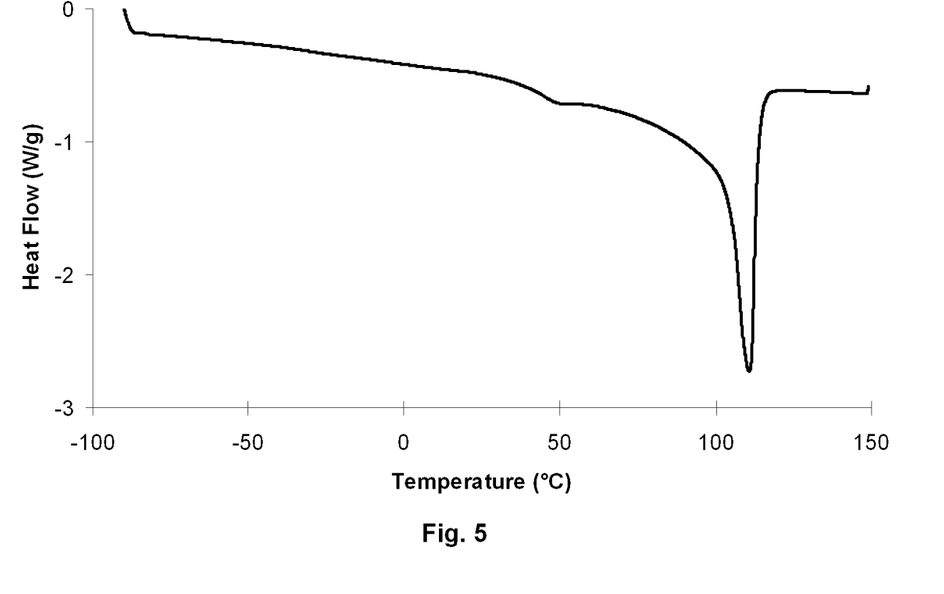
FIG. 5 is a graph showing the relation between the heat flow and the temperature of the same polyethylene substrate of FIG. 1 by differential scanning calorimetry.

This example illustrates the improvement of adhesion of a radiation curable inkjet ink to a substrate typically used for making plastic bags in a temperature working area that normally would not be considered by a skilled person in inkjet printing.
DMA and DSC on the Plastic Bag Substrate
A dynamic mechanic analysis was performed on LDPE foil according to the method described above. The results are shown in FIG. 1 to 4.
In FIG. 1 it can be seen that the storage modulus at −80° C. is about 1900 MPa (stiffness about 59500 N/m). By increasing the temperature the mechanical strength of the LDPE foil decreases sharply to about 200 Mpa at room temperature (stiffness 6500 N/m) and to only about 14 MPa at 100° C. In FIG. 2 the loss modulus peaks at about −22° C., this corresponds with the glass transition temperature ($T_g$). The calculated curve of Tan δ in FIG. 3 increases from −80° C. to a maximum value around a temperature of about 51° C., then decreasing again until 100° C. At 100° C. a sharp increase in Tan δ can be noticed which is due to the rupture of the sample, as can also be seen in FIG. 4 where the sample length drastically drops at 110° C. The reason for this rupture becomes clear from the DSC-thermogram in FIG. 5 which shows that the melting temperature of the polymeric substrate is around 111° C. A "melting shoulder" starting just below 50° C. can also be observed In FIG. 5.
Adhesion of the Radiation Curable Ink
A LDPE foil was immobilized using a vacuum suction system on the metal plate of a thermostatically controllable coating device from ELCOMETER, Belgium. The metal plate was heated using a circulation system employing a hot water bath. The surface temperature of the coating was measured with a hand held IR thermometer Optex Thermo-Hunter Model PT-3LF from OPTEX, USA. A non-aqueous cyan radiation curable inkjet ink: AGORIX Cyan having a surface tension of 22 mN/m was coated on the LDPE foil using a 10 µm wired bar. The heated coating was then cured under a Fe-doped mercury UV lamp 140 W/cm (DPL type 10041) from DPL industri A/S (Denmark). During the first 15 seconds the shutter of the UV lamp was closed, so only a small amount of stray UV light hit the coating, then the shutter was opened and the coating was irradiated during 2 seconds, while the UV power was measured with a UV Power Puck from EIT Inc (USA). The stray light and the two second DPL exposure were measured to have together a dose of 5.82 J/cm$^2$ and a peak intensity of 2.65 W/cm$^2$. The curing degree of the coating was evaluated immediately after curing with UV light.

The hot water bath was set so that two surface temperatures of the LDPE foil were obtained: 24 and 50° C. The comparative sample COMP-1 was coated at 24° C. and appeared fully cured. Comparative sample COMP-2 was prepared in the same way as comparative sample COMP-1 except that the sample was given a 4 seconds UV-exposure with the Fe-doped mercury UV lamp. Inventive sample INV-1 was coated at 50° C. and cured in the same way as comparative sample COMP-1. The results of the adhesion test are shown in Table 2.

TABLE 2

| Sample | Surface temperature | Curing degree | Adhesion |
|---|---|---|---|
| COMP-1 | 24° C. | Fully cured | Not OK |
| COMP-2 | 24° C. | Fully cured | Not OK |
| INV-1 | 50° C. | Fully cured | Excellent |

It was observed that only the sample INV-1 coated at 50° C. showed excellent adhesion, while the other samples COMP-1 and COMP-2 coated at 24° C. exhibited poor adhesion. The double UV-exposure given to comparative sample COMP-2 resulted only in a minor improvement of the adhesion of the ink to the LDPE foil.

The surface energy of the LDPE foil was measured to be 36-38 mJ/m$^2$. After giving a heat treatment of 50° C. for 10 seconds, the surface energy of the LDPE foil was measured and found to be unchanged.

Example 2

This example illustrates a practical implementation of the invention on a single pass inkjet printer.
Single Pass Inkjet Ink Printer A :Dotrix modular single pass inkjet printer from AGFA GRAPHICS was modified to accommodate for transport of a thin web (75µm) of polyethylene foil. These modifications included different positioning of dancer rolls, use of spreader rolls, use of lower friction bearings, . . . . All these modification are well-known for a skilled person in printing presses for flexographic printing on webs of thin flexible foils.

In addition the curing device of the :Dotrix modular single pass inkjet printer was adapted. A shutter having a dichroitic reflector was installed, whereby the peak intensity onto the substrate was increased. The standard curing lamp of the printer was replaced by a thinner mercury arc lamp of smaller electrical power, thus creating less heat and also allowing higher focussing, whereby again a higher power was obtained in function of the dose.

The temperature in the curing zone just above the substrate was monitored during operation of the printer and could be maintained in the range of 70 to 80° C. In the unadapted :Dotrix modular single pass inkjet printer, temperatures of up to 110° C. could be registered.

Primed LDPE Foil

Flexographic printing applications often use a thin layer of primer, preferably less than 10 µm, on the substrate to achieve certain desired properties, such as e.g. a glossy or a mat finish, better adhesion, a specific background color, etc.

A wide range of commercially available primers used in flexography and screen printing were tested on their adhesion quality on the LDPE foil of EXAMPLE 1. Usually aqueous primers are used in flexography. However, it was observed that aqueous primers did not lead to a good adhesion quality in the present invention. Table 3 shows a list of 23 non-aqueous primers and their commercial source. With the exception of the primers PR-11 and PR-16 used in screen printing, all primers are used as non-aqueous primers in flexographic printing applications.

TABLE 3

| Primer | Commercial name of the primer | Commercial source |
|---|---|---|
| PR-1 | UVX 00149-405 | XSYS |
| PR-2 | Uvalux Matlak U0717 | Zeller & Gmelin |
| PR-3 | UV Thermal Transfer Flexo Lacquer UVL287 | Phoenix |
| PR-4 | UV Laser Imprintable Lacquer UVL291 | Phoenix |
| PR-5 | 806934 | Siegwerk |
| PR-6 | EXC90052 UV Varnish Flexo Glu | Arets Graphics |
| PR-7 | Uvaflex transparantwit Y6-X60002 | Zeller & Gmelin |
| PR-8 | UVX 00195-405 | XSYS |
| PR-9 | UVX 00194-405 | XSYS |
| PR-10 | UVF00081 | XSYS |
| PR-11 | Uvoscreen matt varnish UVD00117-408 | XSYS |
| PR-12 | Marabu UVLG3 | Marabu |
| PR-13 | UVF00010-405 | XSYS |
| PR-14 | 125IO36899 | Siegwerk |
| PR-15 | Uvibond UV UV391 | Sericol BV |
| PR-16 | Uvoscreen varnish 9501 UVD00100-405 | XSYS |
| PR-17 | 806916 | Siegwerk |
| PR-18 | UV vernis LV papier/synth 806904M | Siegwerk |
| PR-19 | Uvalux UV-lak U0720 | Zeller & Gmelin |
| PR-20 | UV Flexo varnish GP UVF00021-405 | XSYS |
| PR-21 | Excure 90012 | Arets Graphics |
| PR-22 | EXC90065 UV Varnish Flexo | Arets Graphics |
| PR-23 | EXC90050 UV Varnish Flexo | Arets Graphics |

The primers of Table 3 were coated on the LDPE foil using a bar coater and a 4 µm wired bar. Each coated sample was pre-cured under air using a Fusion DRSE-120 conveyer, equipped with a Fusion VPS/I600 lamp (H-bulb), which transported the samples under the UV-lamp on a conveyer belt at a speed of 20 m/min. All the primed samples were mounted into a web of LDPE foil and the web containing the samples was mounted into the single pass printer. On part of each primed sample a colour image was printed using the non-aqueous cyan radiation curable inkjet inkset :AGORIX from AGFA GRAPHICS, Belgium. The same colour image was also printed on the unprimed LDPE.

The primers and colour images were found to be fully cured. Subsequently the adhesion quality of the primers on the LDPE foil and the adhesion quality of the ink on the primed and unprimed LDPE foil were tested. The surface tension of the liquid primers and the gloss at 60° of the cured primers were measured. The results are shown in Table 4.

TABLE 4

| Primer | Surface tension of primer (mN/m) | Gloss 60° | Adhesion primer | Adhesion ink |
|---|---|---|---|---|
| None | — | — | — | OK |
| PR-1 | 42 | — | NOK | — |

TABLE 4-continued

| Primer | Surface tension of primer (mN/m) | Gloss 60° | Adhesion primer | Adhesion ink |
|---|---|---|---|---|
| PR-2 | 39 | — | NOK | — |
| PR-3 | 39 | — | NOK | — |
| PR-4 | 37 | — | NOK | — |
| PR-5 | 35 | — | NOK | — |
| PR-6 | 37 | — | Acceptable | — |
| PR-7 | 38 | 80.5 | Acceptable | OK |
| PR-8 | 34 | 94.5 | OK | OK |
| PR-9 | 29 | 91.7 | OK | OK |
| PR-10 | 29 | 86.5 | OK | OK |
| PR-11 | 27 | 45.5 | OK | OK |
| PR-12 | 26 | 33.9 | OK | OK |
| PR-13 | 25 | 89.1 | OK | OK |
| PR-14 | 24 | 82.9 | OK | OK |
| PR-15 | 24 | 65.6 | OK | OK |
| PR-16 | 24 | 78.3 | OK | OK |
| PR-17 | 24 | 91.5 | OK | OK |
| PR-18 | 24 | 83.7 | OK | OK |
| PR-19 | 23 | 83.1 | OK | OK |
| PR-20 | 23 | 86.7 | OK | OK |
| PR-21 | 23 | 92.8 | OK | OK |
| PR-22 | 22 | 91.5 | OK | OK |
| PR-23 | 21 | 93.5 | OK | NOK |

It can be seen from Table 4 that a glossy finish or a mat finish can be obtained by using for example primers PR-8 and PR-9 respectively PR-11 and PR-12. The primers in Table 4 are sorted in function of their surface tension. It can be seen that very good adhesion of the primer on the LDPE foil was observed when the surface tension of the primer was at least 4 mN/m smaller than the surface energy of the LDPE foil. A good adhesion of the inkjet inks, having an average surface tension of 22 mN/m, onto the primed substrate was observed as long as the surface tension of the inks was equal or smaller than the surface tension of the primers.

A superior image quality of the colour image was observed using the primers PR-7 to PR-10 compared to the colour images printed using no primer or using the other primers.

While preferred embodiments of the present invention have been described above, it is to be understood that variations and modifications will be apparent to those skilled in the art without departing the scope and spirit of the present invention. The scope of the present invention, therefore, is to be determined solely by the following claims.

The invention claimed is:

1. A radiation curable inkjet printing method comprising the steps of:
 providing a polymeric substrate having a maximum value for Tan δ between 40° C. and 110° C.;
 providing a single pass inkjet printer including at least one page-wide printhead or at least one set of staggered printheads, a transporting device arranged to transport the polymeric substrate, and a curing device;
 jetting onto the polymeric substrate, having a surface energy $S_{sub}$, a non-aqueous radiation curable inkjet liquid having a surface tension $S_{Liq}$, wherein $S_{Liq}$ is smaller than $S_{Sub}$ by at least 4 mN/m; and
 curing the non-aqueous radiation curable inkjet liquid on the polymeric substrate at a surface temperature equal to or higher than a temperature of the maximum value for Tan δ and smaller than a melting point of the polymeric substrate; wherein
 the maximum value for Tan δ is determined by dynamic mechanical analysis at a temperature ramp of 3° C./min using forced oscillation with a cycle of 1 second and an amplitude of 100 μm.

2. The radiation curable inkjet printing method according to claim 1, wherein the curing device is a UV curing device, and a heat produced by the UV curing device is used to create a surface temperature of at least 50° C. on the polymeric substrate.

3. The radiation curable inkjet printing method according to claim 2, wherein the surface temperature is in the range of 50° C. to 100° C.

4. The radiation curable inkjet printing method according to claim 1, wherein the non-aqueous radiation curable inkjet liquid is a pigmented radiation curable inkjet ink.

5. The radiation curable inkjet printing method according to claim 1, further comprising the step of printing a pigmented radiation curable inkjet ink on the non-aqueous radiation curable inkjet liquid.

6. The radiation curable inkjet printing method according to claim 5, wherein a surface tension of the pigmented radiation curable inkjet ink is not more 5 mN/m smaller than the surface tension of the non-aqueous radiation curable inkjet liquid.

7. The radiation curable inkjet printing method according to claim 1, further comprising the step of providing a corona treatment to the polymeric substrate.

8. The radiation curable inkjet printing method according to claim 1, wherein the polymeric substrate includes a primer layer, and a thickness of the primer layer is less than 5 μm.

9. The radiation curable inkjet printing method according to claim 1, wherein the polymeric substrate is a polyethylene substrate.

* * * * *